(12) United States Patent
Ancora et al.

(10) Patent No.: US 8,092,586 B2
(45) Date of Patent: Jan. 10, 2012

(54) TITANIUM DIOXIDE BASED PHOTOCATALYTIC COMPOSITES AND DERIVED PRODUCTS ON A METAKAOLIN SUPPORT

(75) Inventors: Renato Ancora, Brindisi (IT); Massimo Borsa, Bergamo (IT); Luigi Cassar, San Donato Milanese (IT)

(73) Assignee: Italcementi S.p.A., Bergamo (IT)

( * ) Notice: Subject to any disclaimer, the term of this patent is extended or adjusted under 35 U.S.C. 154(b) by 68 days.

(21) Appl. No.: 12/747,948

(22) PCT Filed: Dec. 17, 2008

(86) PCT No.: PCT/EP2008/067728
§ 371 (c)(1),
(2), (4) Date: Jun. 14, 2010

(87) PCT Pub. No.: WO2009/080647
PCT Pub. Date: Jul. 2, 2009

(65) Prior Publication Data
US 2010/0266470 A1 Oct. 21, 2010

(30) Foreign Application Priority Data
Dec. 19, 2007 (IT) ............... MI2007A2387

(51) Int. Cl.
*B01J 21/00* (2006.01)
*B32B 13/00* (2006.01)
*C04B 22/06* (2006.01)
*C04B 28/26* (2006.01)

(52) U.S. Cl. ........ 106/416; 106/436; 106/442; 106/638; 106/733

(58) Field of Classification Search .............. 106/416, 106/436, 442, 638, 733; 423/245.1, 215.5, 423/239.1, 244.09; 502/350
See application file for complete search history.

(56) References Cited

U.S. PATENT DOCUMENTS

| 5,152,835 | A | 10/1992 | Nemeh | |
|---|---|---|---|---|
| 6,409,821 | B1 * | 6/2002 | Cassar et al. | 106/733 |
| 2006/0147756 | A1 * | 7/2006 | Cassar et al. | 428/703 |
| 2008/0236450 | A1 * | 10/2008 | Bonafous et al. | 106/690 |
| 2008/0255291 | A1 * | 10/2008 | Sare et al. | 524/447 |
| 2010/0266470 | A1 * | 10/2010 | Ancora et al. | 423/239.1 |

FOREIGN PATENT DOCUMENTS

| EP | 1405835 | 7/2004 |
|---|---|---|
| KR | 20030021302 | 3/2003 |
| WO | WO2004074202 | 9/2004 |

OTHER PUBLICATIONS

Notification of Transmittal of the International Search Report and the Written Opinion of the International Searching Authority, or the Declaration of International Application No. PCT/EP2008/067728 dated May 26, 2009.
Notification of Transmittal of the International Preliminary Report on Patentability of International Application No. PCT/EP2008/067728 dated Dec. 19, 2007.

* cited by examiner

*Primary Examiner* — Timothy Vanoy
(74) *Attorney, Agent, or Firm* — Abelman, Frayne & Schwab

(57) ABSTRACT

Described herein is a photocatalytic composite comprising a titanium dioxide supported on metakaolin. In comparison to known embodiments of the sector, the composite of the present invention makes it possible to obtain binders and derived products with high photocatalytic efficiency, even when using photocatalyst quantities which are lesser than those present in products of prior technical art.

26 Claims, 2 Drawing Sheets

TITANIUM DIOXIDE BASED PHOTOCATALYTIC COMPOSITES AND DERIVED PRODUCTS ON A METAKAOLIN SUPPORT

CROSS-REFERENCE TO RELATED APPLICATIONS

This application is a National Phase of PCT/EP2008/067728, filed 17 Dec. 2008 which claims priority from Italian Application No. MI2007A 002387, filed 19 Dec. 2007, both of which are incorporated herein by reference.

FIELD OF THE INVENTION

The present invention relates to new photocatalytic composites and their derived products, comprising titanium dioxide on a metakaolin support.

PRIOR ART

In its crystalline form of anatase, titanium dioxide is a known photocatalytic agent. In the presence of light and ambient humidity, it catalyses the oxidation of various contaminants present in the atmosphere, favourising the process of degradation and elimination.

Cement products are conventionally known in the field of construction, which contain titanium dioxide in bulk or as covering surface layers (PCT/EP9704008, EP885857, EP1196359).

The photocatalytic action of the titanium dioxide protects the concrete products from colour change caused by environmental pollutants. Furthermore, buildings constructed with these products have a much more pleasing appearance, because of the permanent duration of the original colour, without the need for frequent surface cleaning cycles. Titanium dioxide is also used in paints, pastes, or other coating compositions for application on pre-existent buildings in order to preserve the original colour. (MI2007A001508).

Urban road paving products containing titanium dioxide also exist, such as paving blocks, road surfacing products, etc. (PCT/EP2004/0015, PCT/EP2005/0529). These products are prevalently used to reduce urban traffic pollutants (N-oxides, hydrocarbons etc.): these substances become adsorbed on the porous surface of the product and oxidised to form non-volatile components, that can be washed away by rain water.

Although the aforesaid concrete products have proven efficient for the aim in question, ongoing constant research is carried out to identify new compositions and products with greater photocatalytic capacity, or with the same capacity, but with a lesser photocatalyst content.

The latter is particularly important in the concrete sector, characterised by the use of enormous quantities of products having a very low cost/weight ratio: for these products, the addition of fine chemical additives such as titanium dioxide, leads to very high price increases. This explains the importance of maintaining high-level photocatalytic effects, while using smaller quantities of photocatalyst.

In all the aforesaid products, there is no specific interaction between photocatalyst and support elements; the aforesaid products in bulk are obtained by means of a simple physical mixing process of the various components, while coated products are obtained through stratification of the photocatalyst on a pre-existent support. In both cases the relation between the two components is that of adjacency.

In the photocatalytic product sector, as well as cement, the use of other inert inorganic materials is also known, such as clay, kaolin, etc. For example, patent KR-A-20010074099 describes a clay, kaolin and graphite based $(Al_2Si_2O_5(OH)_4)$ photocatalytic brick, covered with a surface layer of titanium dioxide. Patent CN-A-1696228 describes a paint containing nanoparticles of doped titanium dioxide, kaolin, wallastonite, calcium carbonate and other components.

SUMMARY

A first aim of the present invention is to provide a new photocatalytic composite, suitable to obtain binders and derived products with high photocatalytic efficiency, while using small quantities of photocatalyst. The invention also aims at providing a composite of the aforesaid type, wherein the photocatalyst bonded in a strong and stable manner to a support material. A further aim of the invention is to provide composite and derived products, which are active not only for reactivity on surfaces, but also in bulk in other words, also within the layers not on the surface. These and other aims are achieved by means of new photocatalytic composites and their derived products (binders, dry premixed products, cementitious compositions, and finished manufactured products) according to the present invention, comprising titanium dioxide on a metakaolin support; the invention also includes the method to obtain these products and their industrial use. When compared to known products of the sector, the composite according to the invention provides highly efficient photocatalytic binders, even though they contain a small quantity of photocatalyst, generally smaller than the amounts used in known prior art.

In the composite, object of this invention, the titanium dioxide is bonded to the metakaolin support in a stable manner and characteristic physical form.

DESCRIPTION OF APPENDED FIGURES

DETAILED DESCRIPTION

Figure 1:
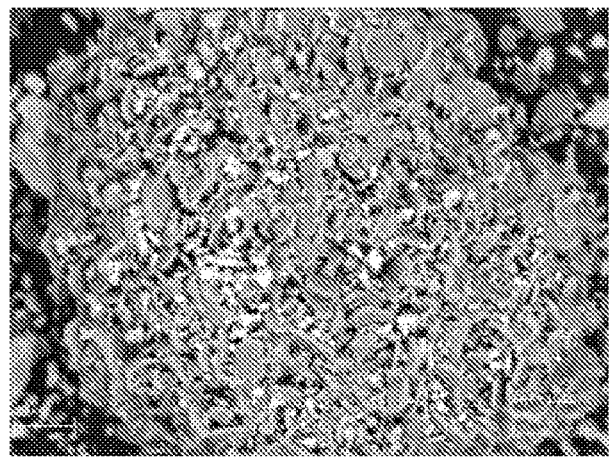
FIG. 1 is a photo taken with a Scanning Electron Microscope (SEM), which shows TiO2 crystal grains on an alumina support.

The photocatalytic composite of the present invention comprises titanium dioxide, as a photocatalyst agent, on a metakaolin support.

The titanium dioxide (also referred to herein as $TiO_2$) is preferably used in its crystalline form of anatase. In the $TiO_2$ used herein, this form is present in a prevalent or exclusive form: the term "prevalent" refers to the $TiO_2$ in anatase form for at least 50% of the weight in relation to the total $TiO_2$; the terms "exclusive" or "total" refer to 100%; in a particularly preferred embodiment of the invention said percentage of anatase is at least 90%. The particles of titanium dioxide have a specific BET surface preferably between 5 and 350 $m^2/g$, and more particularly, between 100 and 300 $m^2/g$.

The metakaolin used as a support $(Al_2O_3 2SiO_2)$ is the dehydroxylated form of the kaolinite clay mineral, commonly obtained through calcination; metakaolin is available on the market (for example: see the METASTAR 501 product used in the experiments herein, having a specific BET surface of 12.6 m$^2$/g).

In the present description, the term "photocatalytic" refers to the properties of the product in question which, in the presence of light and air, are able to catalyse a decomposition reaction of one or more pollutants present in the environment, whether these be inorganic or organic; examples of these pollutants are aromatic polycondensates, aldehydes, PM10 concentration soot, nitrogen oxides ($NO_x$) and sulphur oxides ($SO_x$).

Preferably, 50% of the weight of the composites according to the invention is composed of titanium dioxide and the remaining 50% of the metakaolin support. However the invention includes every other ratio between these two components. The titanium dioxide/metakaolin composite is present "in bulk", in other words, added "to bulk" of the concrete, in a manner so that it is distributed not only on the surface of the concrete but also throughout the deep internal layers.

The composite can be used in the preparation of derived products such as binders, dry premixed products, and ready-to-use cementitious compositions (particularly paste, mortar or concrete mixes): and as such, each of these products comprises a specific embodiment of the invention.

The binder according to the invention comprises the aforesaid composite mixed with an appropriate hydraulic binder. In the binder according to the invention, as in its derived products, the photocatalytic composite is present in bulk, according to the definition provided above.

The term "hydraulic binder" refers to a pulverized material in a solid dry state, which when mixed with water forms plastic mixes able to set and harden, even under water, such as cement for example. Examples of possible hydraulic binders are cements in compliance with the standard: ENV 197.1, and hydraulic limes as defined in the law No. 595, passed on 26 May 1965, or mixtures thereof. The photocatalytic binder according to the invention possesses a quantity of titanium dioxide between 0.1 and 10% in weight, calculated as the amount of $TiO_2$ in relation to the cement; advantageously, said amount can be maintained at average to low levels, such as between 0.1 and 4%, or between 0.1 and 2.5%, to obtain excellent photocatalytic results; thus photocatalytic cement products can be obtained with high efficiency/cost ratios in agreement with the aims of the invention.

By mixing the aforesaid binder with possible fine or coarse aggregate and other possible cement production additives, dry pre-mixed products can be obtained: these contain all the components except water necessary to form photocatalytic cementitious compositions ready for use (particularly paste, mortar or concrete mixes). Among the additives commonly used in the sector and possibly present in dry premixed products, are fluidifiers, superfluidifiers, aerating agents, pozzolanic additives, fillers, etc.

Cementitious compositions, obtained through adding water to the aforesaid premixed products, include both cement pastes, or mixes composed of binder and water with no aggregate, as well as conglomerates, or mixes composed of water, binder and aggregate. The "aggregate" or "inerts" or "inert aggregate", are synonyms according to the present invention, and are classified in the UNI EN 206 standard. These can be fine aggregate such as sand, or coarse aggregate. Conglomerate examples include mortars (mixes composed of binder, water and fine aggregates), and cement mixes (mixes composed of water, binder, fine aggregate and coarse aggregate). The amount of aggregate, the water/cement ratio and the mixing method used to form cementitious compositions are those used conventionally in this sector.

Photocatalytic cementitious products produced using the mixes of the invention are able to reduce organic and inorganic pollutants present in the environment, such as aromatic polycondensates, aldehydes, PM10 concentration soot, nitrogen oxides ($NO_x$) and sulphur oxides ($SO_x$). Their effect is particularly intense in relation to $NO_x$.

Therefore, a further aim of the invention is a photocatalytic cement product, chosen from among architectural elements, paving blocks, road surfacing products, tunnel or garage ceiling vaults, paving stones, blocks, bricks, paint, plaster finish, render, monumental elements, extruded products, and tiles, prepared using the cement mix.

The photocatalyst composite of the invention can also be used in non cement paint products such as silicatic paint finishes with potassium, siloxanic or acrylic silicates. The invention also includes a method for the reduction of pollutants present in the environment, characterised by the contact with the said environment, in the presence of light and air, with one or more products as described previously. The pollutants are preferably chosen from among aromatic polycondensates, aldehydes, PM10 concentration soot, nitrogen oxides ($NO_x$) and sulphur oxides ($SO_x$).

The method used to prepare the aforesaid composite, and the composite that can be obtained with this method, form a further aim of the invention. In its more general acceptance the process comprises the method of contact between the metakaolin and $TiO_2$ or one of its precursors (ex. $TiCl_4$, $Ti(OH)_4$ or $TiOSO_4$, or other precursors known to prior art). When beginning directly with $TiO_2$, this can be mixed directly with the metakaolin using conventionally known methods. When beginning with a $TiO_2$ precursor, this is preferably added to an alkaline suspension containing metakaolin, appropriately maintained in agitation for a period of time between approximately 30 and 120 minutes; the mixing conditions (pH temperature, etc.) are chosen in a manner to obtain the hydrolysis of the $TiO_2$ precursor; these conditions are conventionally known, and examples of their application are provided in the experimental part; the metakaolin is then recovered from the suspension using techniques which are conventionally known, such as filtration and/or centrifugation, dried, for example at 100° C. and then subjected to thermal treatment. In order to obtain the best possible photocatalytic results, the thermal treatment should be performed at a temperature between 300° C. and 700° C., preferably between 350 and 650° C. for a period of time between 1 and 5 hours, preferably between 2 and 3 hours; this treatment being advantageously applicable also for composites obtained directly from $TiO_2$.

Non-limiting illustrations of some examples relating to the preparation are provided below, also illustrating further characteristics and advantages of the invention.

EXPERIMENTAL PART

1. Preparation of the Catalyzer of the Invention (TCMC)
1.1 Sedimentation of a $TiCl_4$ Aqueous Solution
Reagents The reagent solutions used for sedimentation are as follows:
 Sol 1: $TiCl_4$ (10 ml $TiCl_4$/100 ml solution); 100 ml of $TiCl_4$ (Titanium (IV) chloride (Fluka) ≧98.0%) brought to a volume of 1 liter in distilled water.
 Sol 2: $NH_4HCO_3$ 2M; 158.1 g of $NH_4HCO_3$ (Ammonium hydrogen carbonate—Carlo Erba) dissolved in distilled water and brought to a volume of 1 liter.
 Metakaolin Metastar 501.

Photocatalyst Synthesis

To obtain 60 grams of photocatalytic product (containing 50% of $TiO_2$ in weight) 30 grams of metakaolin are suspended in 750 ml of the basic solution Sol 2 and subjected to vigorous agitation. 420 ml of Sol 1 are left to drip for a period of about 60 minutes. The pH measured at the end of the dripping stage is approximately 7 and in these conditions, the hydrolysis reaction is completed. The reaction waters are separated by means of centrifugation (or filtration under vacuum). In order to eliminate the soluble salts 3-5 washing stages are performed, each one in 1.5 liters of distilled water at a temperature of approximately 80° C. The separation of the washing liquid is obtained by means of filtration under vacuum or, preferably, through centrifugation using a large volume centrifuge.

The damp powders thus obtained are dried in a ventilated furnace at 105° C. and successively undergo forced desegregation of the agglomerated powder, using a rotating blade homogenizer.

Lastly, they undergo thermal treatment in air in a muffle furnace at a temperature of 650° C. for 2.5 hours followed by a rapid cooling action placing the material directly in the dryer at ambient temperature. A $TiO_2$ catalyzer on metakaolin is thus obtained, wherein the crystallographic form of anatase is greater than 90%.

1.2 Sedimentation of a Titanyl Sulfate Aqueous Solution (STMC01)

Reagents

The reagent solutions used for the sedimentation are as follows:

Sol 1: $TiOSO_4$ (10 g $TiO_2$/100 ml solution); 345 g of $TiOSO_4$ (Titanium (IV) oxysulfate hydrate Riedel—de Haën $TiO_2 \geqq 29\%$) dissolved in distilled water and brought to a volume of 1 liter.

Sol 2: $NH_4HCO_3$ 2M; 158.1 g of $NH_4HCO_3$ (Ammonium hydrogen carbonate—Carlo Erba) dissolved in distilled water and brought to a volume of 1 liter.

Metakaolin Metastar 501.

Photocatalyst Synthesis

To obtain 60 grams of photocatalytic product (containing 50% of $TiO_2$ in weight) 30 grams of metakaolin are suspended in 460 ml of the basic solution Sol 2 and subjected to vigorous agitation. 300 ml of Sol 1 (titanium dioxide precursor) are left to drip for a period of about 60 minutes. The pH measured at the end of the dripping stage is approximately 7 and in these conditions, the hydrolysis reaction is completed. The reaction waters are separated by means of centrifugation (or filtration under vacuum). In order to eliminate the soluble salts, 2 washing stages are performed, each one in 1.5 liters of distilled water at a temperature of approximately 80° C. The separation of the washing liquid is obtained by means of filtration under vacuum or, preferably, through centrifugation using a large volume centrifuge.

The damp powders thus obtained are dried in a ventilated furnace at 105° C. and successively undergo forced desegregation of the agglomerated powder, using a rotating blade homogenizer. The quantitative analysis of the sulfates on the powders obtained shows the presence of a quantity of less than 1% of $SO_3$.

Lastly, they undergo thermal treatment in air in a muffle furnace at a temperature of 650° C. for 2.5 hours followed by a rapid cooling action placing the material directly in the dryer at ambient temperature.

1.3 Sedimentation of a Titanyl Sulfate Aqueous Mixture (STMC 02)

Reagents

The reagent solutions used for the sedimentation are as follows:

Sol 1: $TiOSO_4$ (10 g $TiO_2$/100 ml solution); 345 g of $TiOSO_4$ (Titanium (IV) oxysulfate hydrate Riedel—de Haën $TiO_2 \geqq 29\%$) dissolved in distilled water and brought to a volume of 1 liter.

Sol 2: NaOH (14 g/100 ml); 140.0 g of NaOH (NaOH anhydrous pellets RPE—Carlo Erba) dissolved in distilled water and brought to a volume of 1 liter.

Metakaolin Metastar 501.

Photocatalyst Synthesis

To obtain 60 grams of photocatalytic product (containing 50% of $TiO_2$ in weight) 30 grams of metakaolin are suspended in 300 ml of the basic solution Sol 2 and subjected to vigorous agitation. 300 ml of Sol 1 (titanium dioxide precursor) are left to drip for a period of about 60 minutes. The pH measured at the end of the dripping stage is approximately 7 and in these conditions, the hydrolysis reaction is completed. The reaction waters are separated by means of centrifugation (or vacuum filtration). In order to eliminate the soluble salts, 2 washing stages are performed, each one in 1.5 liters of distilled water at a temperature of approximately 80° C. The separation of the washing liquid is obtained by means of vacuum filtration or, preferably, through centrifugation using a large volume centrifuge.

The damp powders thus obtained are dried in a ventilated furnace at 105° C. and successively undergo forced desegregation of the agglomerated powder, using a rotating blade homogenizer.

The quantitative analysis of the sulphates on the powders obtained shows the presence of a quantity of less than 1% of $SO_3$.

Lastly, they undergo thermal treatment in air in a muffle furnace at a temperature of 650° C. for 2.5 hours followed by a rapid cooling action placing the material directly in the dryer at ambient temperature.

2. Preparation of Photocatalytic Cement Binders

A set of preparations was produced in order to obtain photocatalytic products with a $TiO_2$/metakaolin weight ratio of 20/80, 30/70 and 50/50.

Another study was performed on the TCMC product containing the 50% of titanium dioxide, subjecting the powders obtained, after drying at 100° C., to thermal treatments at 250, 350, 450, 550, 650° C. photocatalytic cement binders were prepared in the laboratory by mixing Italcementi white cement, type 52.5 from their cement works in Rezzato (Italbianco), with the prepared photocatalytic powders. The product obtained through thermal treatment at 650° C. was used in the production of binders containing percentages of 0.1, 0.3, 0.5, 1.0, 1.5, 2.0, 2.5, 3.3 and 4.0% of $TiO_2$ weight in cement, while the products obtained at temperatures of 100, 250, 350, 450 and 550° C. were used to produce cements containing the 3.3% of $TiO_2$.

Catalyzer for comparison were also prepared from an aqueous solution of $TiCl_4$ on supports of alumina and kaolin, respectively.

3. Reduction According to the Percentage of $TiO_2$ in Cement

Pre-prepared photocatalytic cements were used to produce samples of mortar (CEN, UNI EN 196-1), prepared in circular shaped moulds (diameter 80 mm and height 10 mm), mixing 450 g of cement and $TiO_2$ on metakaolin, in a 50/50% weight proportion with thermal treatment at 650° C., 1350 g of inert sand, 225 g of water. After curing for 28 days in controlled temperature and humidity conditions (T=20° C., RH.>95%) the specimens were subjected to photocatalytic cement assessment tests, measuring the reduction levels of NO (UNI standard 11247:2007). The results obtained according to the percentage of $TiO_2$ in cement, are shown in Table 1 below.

TABLE 1

| $TiO_2$ (weight % in cement) | NO reduction at 30 min (%) | NO reduction at 60 min (%) |
|---|---|---|
| 0.1 | 17 | 29 |
| 0.3 | 29 | 48 |
| 0.5 | 28 | 54 |
| 1.0 | 54 | 82 |
| 1.5 | 56 | 82 |
| 2.0 | 56 | 83 |
| 2.5 | 67 | 91 |
| 3.3 | 79 | 97 |
| 4.0 | 81 | 98 |

The table above demonstrates that by increasing the percentage of $TiO_2$ in cement, with the same support, the reduction of NO at 60 minutes reaches levels over 90% for a $TiO_2$ content of approximately 2.5%. Therefore, even with a low catalyzer content, very high NO reduction levels were obtained.

4. Reduction According to the Thermal Treatment of the Composite

In a second test, the percentage of NO reduction was measured on mortars containing different samples of $TiO_2$ catalyzer on metakaolin with 50/50% weight ratio, where the composite was subjected to thermal treatments at different temperatures, in a range between 100 and 650° C. The results obtained are shown in Table 2. The photocatalytic activity resulted as considerable for all samples tested, with excellent levels for samples treated at temperatures over 350° C.

TABLE 2

| T° C. | $TiO_2$ (weight % in cement) | NO reduction at 30 min (%) | NO reduction at 60 min (%) |
|---|---|---|---|
| 100 | 3.3 | 27 | 45 |
| 250 | 3.3 | 35 | 58 |
| 350 | 3.3 | 68 | 89 |
| 450 | 3.3 | 67 | 88 |
| 550 | 3.3 | 73 | 92 |
| 650 | 3.3 | 79 | 97 |

By selecting the temperature of 400° C. for the treatment of the $TiO_2$ (50%)/metakaolin composite, a set of mortar samples was produced containing 0.5, 1.0, 2.0, 3.0 and 4.0% of $TiO_2$. The results of the NO reduction tests are shown in Table 3 and confirm the high photocatalytic activity of the composite.

TABLE 3

| T (° C.) | $TiO_2$ (weight % in cement) | NO reduction at 30 min (%) | NO reduction at 60 min (%) |
|---|---|---|---|
| 400 | 0.5 | 33 | 54 |
| 400 | 1.0 | 39 | 63 |
| 400 | 2.0 | 66 | 89 |
| 400 | 3.0 | 68 | 90 |
| 400 | 4.0 | 74 | 93 |

5. Reduction According to the Type of Support

In a later test, the reduction percentage of NO was measured on mortars obtained from samples containing 3.3% of $TiO_2$ where the $TiO_2$ was applied on supports with different mineral components: metakaolin, kaolin and alumina. A parallel test was also performed on a mortar containing an equal amount of $TiO_2$ not applied on a support, respectively commercial TiO2 anatase with high photocatalytic activity (PC105), and $TiO_2$ prepared using the catalyzer method shown in the previous tables, but not applied on a support. The results shown in Table 4 demonstrate that only the product of the invention on a metakaolin support was able to provide a greater photocatalytic effect on physical cement and $TiO_2$ mixes. The reference samples containing $TiO_2$ on a kaolin (TCKA01) or alumina (TCAL01) support, demonstrated lesser photocatalytic activity. This shows that the bond between $TiO_2$ and support is not advantageous for photocatalytic activity in itself, and only those composites on a metakaolin support showed an obvious improvement in comparison to products not on supports.

TABLE 4

| Photocatalytic composite | $TiO_2$ (weight % in cement) | NO reduction at 30 min (%) | NO reduction at 60 min (%) |
|---|---|---|---|
| $TiO_2$ on metakaolin TCMC | 3.3 | 79 | 97 |
| $TiO_2$ on kaolin TCKA-01 | 3.3 | 35 | 63 |
| $TiO_2$ on alumina TCAL-01 | 3.3 | 55 | 77 |
| $TiO_2$ PC 105 With no support | 3.3 | 60 | 86 |
| $TiO_2$ su metakaolin With no support | 3.3 | 67 | 89 |

6. Photographic Analysis

Figure 2:
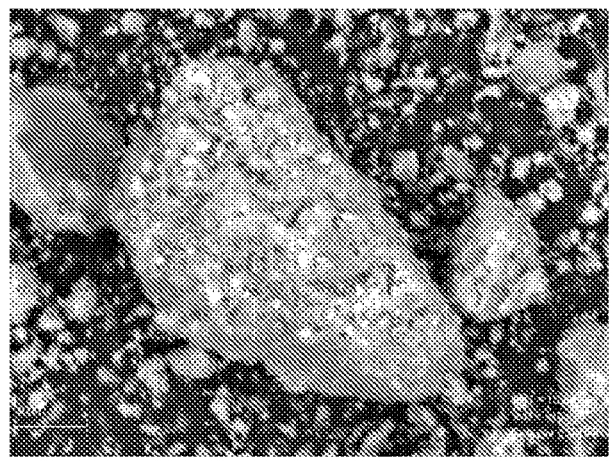
FIG. 2 is a photo taken with a Scanning Electron Microscope (SEM), which shows TiO2 crystal grains on a kaolin support.
Figure 3:
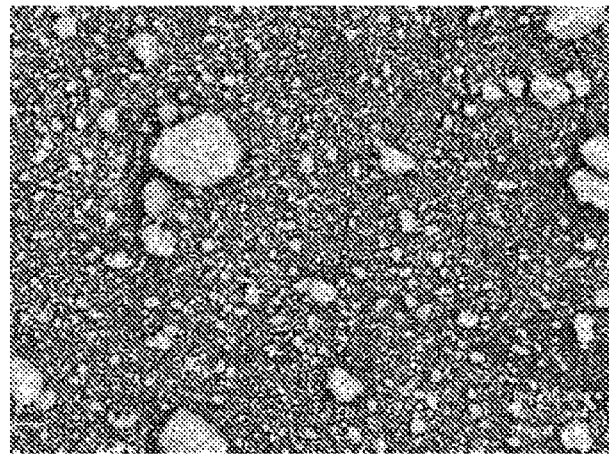
FIG. 3 is a photo taken with a Scanning Electron Microscope (SEM), which shows TiO2 crystal grains on an alumina support according to the invention.
Figure 4:
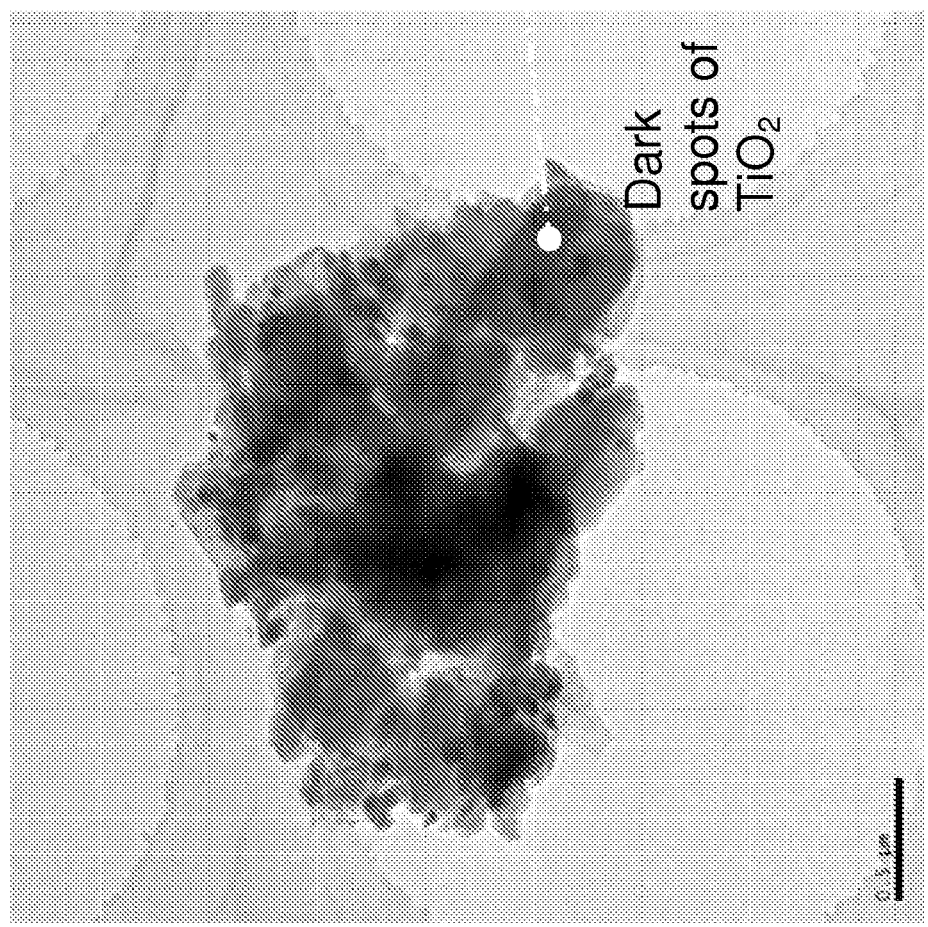
FIGS. 4 and 5 are photos taken with a Scanning Electron Microscope (SEM), which show TiO2 crystal grains on a kaolin support; (in a 50/50 weight ratio), according to the invention.
Figure 5:
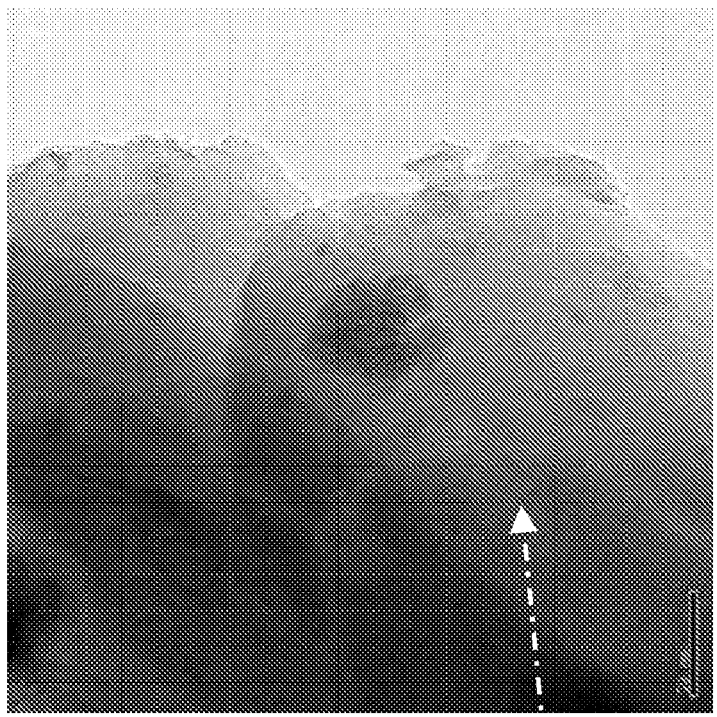

An analysis was made of the SEM images taken with an electronic microscope, of the different composites used in Table 4. The images shown in FIGS. 1 to 3 show considerable differences in the physical structure of the composites under examination: in the case of the alumina, the $TiO_2$ crystals form in the cavities (microporosities) of the flakes; in the case of the metakaolin, the $TiO_2$ coats the support grains externally; the sample on kaolin presents an intermediate structure. FIGS. 4 and 5 show photos taken with the TEM microscope of a further TiO2/metakaolin (50/50) composite according to the present invention. These photos demonstrate how the $TiO_2$ is present in particles agglomerated in micrometric clusters, and no loose $TiO_2$ powders can be observed. Without wishing to be bound by theory, it is considered that the modality of the $TiO_2$ adhesion to the support as shown in the FIGS. 1-5 contributes towards the improvement of the photocatalytic activity found with metakaolin.

The invention claimed is:

1. A composite for the preparation of hydraulic binders, dry premixed products, cementitious compositions or cementitious products with photocatalytic activity, wherein the said composite comprises titanium dioxide bonded to a metakaolin support by thermal treatment.

2. Composite according to claim 1, characterised in that it comprises 50% by weight of titanium dioxide and 50% by weight of metakaolin.

3. Composite according to claim 1, characterised in that it comprises 20% by weight of titanium dioxide and 80% by weight of metakaolin.

4. Composite according to claim 1, characterised in that it comprises 30% by weight of titanium dioxide and 70% by weight of metakaolin.

5. Composite according to claim 1, characterised in that titanium dioxide is prevalently in the anatase crystallographic form.

6. Composite according to claim 1, wherein titanium dioxide has a specific BET surface between 5 and 350 m²/g.

7. Composite according to claim 1, wherein the cementitious composition is a paste.

8. Composite according to claim 1, wherein the cementitious composition is a mortar.

9. Composite according to claim 1, wherein the cementitious composition is a concrete.

10. Composite according to claim 1, wherein the thermal treatment is carried out at a temperature between 300° C. and 700° C.

11. Composite according to claim 10, wherein the thermal treatment is carried out at a temperature between 350 and 650° C.

12. Composite according to claim 1, wherein the thermal treatment is carried out between 1 and 5 hours.

13. A photocatalytic binder, comprising a composite according to claim 1, in a mixture with a hydraulic binder.

14. The photocatalytic binder according to claim 13, characterised in that it comprises titanium dioxide between 0.1 to 10% by weight.

15. The photocatalytic binder according to claim 14, characterised in that it comprises titanium dioxide between 0.1 to 4% by weight.

16. The photocatalytic binder according to claim 15, characterised in that it comprises 3.3% of $TiO_2$ by weight.

17. The photocatalytic binder according to claim 13, characterised in that the hydraulic binder is a cement or a lime.

18. A dry premixed product, characterised in that it comprises the photocatalytic binder according to claim 13, aggregates and cement additives.

19. A cementitious composition comprising a photocatalytic composite according to claim 1.

20. The composition according to claim 19, characterised in that it is a paste, a mortar or a concrete.

21. A method for the preparation of a composite according to claim 1, comprising the step of contacting a metakaolin support and titanium dioxide, or one of its precursors, to have them bonded by thermal treatment.

22. The method according to claim 21, characterised in that the product obtained from the contact is subjected to a thermal treatment at a temperature between 300° C. and 700° C., for a period of time between 1 and 5 hours.

23. A photocatalytic cement product obtained from a cementitious composition according to claim 19.

24. A product according to claim 23, selected from the group consisting of architectural elements, paving blocks, road surfacing products, tunnel or garage ceiling vaults, paving stones, blocks, bricks, fountains, seating benches, and monumental elements.

25. A method for the reduction of pollutants present in the environment, characterised by exposing the environment in the presence of light and air, to one or more products according to claim 23.

26. The method according to claim 25, wherein said pollutants are selected from the group consisting of aromatic polycondensates, aldehydes, PM10 concentration soot, nitrogen oxides ($NO_x$) and sulphur oxides ($SO_x$).

* * * * *